(12) United States Patent
Park (10) Patent No.: US 6,967,959 B2
(45) Date of Patent: Nov. 22, 2005

(54) METHOD FOR FORMING A DATABASE TO ROUTE A DATA PACKET AND METHOD FOR ROUTING AND A ROUTER USING THE METHOD THEREOF

(75) Inventor: Woo-jong Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 976 days.

(21) Appl. No.: 09/938,505

(22) Filed: Aug. 27, 2001

(65) Prior Publication Data

US 2003/0041169 A1 Feb. 27, 2003

(30) Foreign Application Priority Data

Aug. 26, 2000 (KR) ............................... 2000-49932

(51) Int. Cl.[7] .......................................... H04L 12/28
(52) U.S. Cl. ....................... 370/401; 370/392; 709/238
(58) Field of Search ................................. 370/389, 390, 370/392, 396, 400, 401, 408; 709/238, 239, 709/240, 241, 242, 243, 244

(56) References Cited

U.S. PATENT DOCUMENTS

| | | | | |
|---|---|---|---|---|
| 5,570,340 A | * | 10/1996 | Lee et al. ................. | 369/47.31 |
| 6,011,795 A | * | 1/2000 | Varghese et al. ............ | 370/392 |
| 6,018,524 A | * | 1/2000 | Turner et al. ................ | 370/392 |
| 6,307,855 B1 | * | 10/2001 | Hariguchi .................... | 370/392 |
| 6,421,342 B1 | * | 7/2002 | Schwartz et al. ........... | 370/392 |
| 6,434,115 B1 | * | 8/2002 | Schwartz et al. ........... | 370/235 |
| 6,571,313 B1 | * | 5/2003 | Filippi et al. ................ | 711/108 |
| 6,633,865 B1 | * | 10/2003 | Liao .............................. | 707/3 |
| 6,675,163 B1 | * | 1/2004 | Bass et al. ..................... | 707/6 |
| 2001/0028651 A1 | * | 10/2001 | Murase ........................ | 370/392 |
| 2001/0056417 A1 | * | 12/2001 | Cao et al. ...................... | 707/3 |
| 2002/0080798 A1 | * | 6/2002 | Hariguchi et al. ...... | 370/395.31 |
| 2003/0005146 A1 | * | 1/2003 | Miller et al. ................ | 709/238 |

* cited by examiner

Primary Examiner—Bob A. Phunkulh
(74) Attorney, Agent, or Firm—Sughrue Mion, PLLC

(57) ABSTRACT

A method for forming a database to route a data packet from a plurality of prefixes and a method for routing and a router using the method thereof are disclosed. The method for forming the database including the steps of: forming a main-table by aligning the prefixes into a reference length, storing information about the prefixes when the length of the prefixes is shorter than the reference length, and storing connection information about a table from which information about the prefixes can be obtained when the length of the prefixes is longer than the reference length at an entry of the main-table, and forming a sub-table with respect to prefixes having longer length than the reference length by calculating a distance between a base point and the respective prefixes and arraying nodes having a same distance, the base point being a node indicated by the connection information.

7 Claims, 8 Drawing Sheets

ORIGINAL PREFIX TREE

EXPANDED PREFIX TREE

FIG.3A

| Prefix | information |
|--------|-------------|
| 01     | A           |
| 1      | B           |
| 0011   | C           |
| 011    | D           |
| 100    | E           |
| 110    | F           |

EXPANDING PREFIX

FIG.3B

| expanded prefix | information |
|-----------------|-------------|
| 0000 | Null |
| 0001 | Null |
| 0010 | Null |
| 0011 | C |
| 0100 | A |
| 0101 | A |
| 0110 | D |
| 0111 | D |
| 1000 | E |
| 1001 | E |
| 1010 | B |
| 1011 | B |
| 1100 | F |
| 1101 | F |
| 1110 | B |
| 1111 | B |

FIG.4A

| Prefix | node number |
|---|---|
| 000 | 1 |
| 00011 | 2 |
| 0010 | 3 |
| 010 | 4 |
| 01001 | 5 |
| 0101 | 6 |
| 100 | 7 |
| 101000 | 8 |
| 101001 | 9 |
| 11101000 | 10 |
| 11101001 | 11 |

| Prefix | information |
|---|---|
| 01 | A |
| 1 | B |
| 0011 | C |
| 011 | D |
| 100 | E |
| 110 | F |

ORIGINAL PREFIX

FIG.5B

| aligned prefix | information or pointer |
|---|---|
| 00 | ◇ |
| 01 | ◇ |
| 10 | ◇ |
| 11 | ◇ |

ALIGNED PREFIX

FIG.5C

| sub prefix | information |
|---|---|
| 11 | C |

| sub prefix | information |
|---|---|
|  | A |
| 1 | D |

| sub prefix | information |
|---|---|
| 0 | E |
| others | B |

| sub prefix | information |
|---|---|
| 0 | F |
| 1 | B |

SUB PREFIX

FIG.6A

| Prefix | information |
|--------|-------------|
| 01     | A           |
| 1      | B           |
| 0011   | C           |
| 011    | D           |

ORIGINAL PREFIX

FIG.6B

| aligned prefix | information or pointer |
|----------------|------------------------|
| 00             | ◇                      |
| 01             | ◇                      |
| 10             | B ◆                    |
| 11             | B ◆                    |

ALIGNED PREFIX

FIG.6C

| sub prefix | information |
|------------|-------------|
| 11         | C           |

| sub prefix | information |
|------------|-------------|
| 1          | A           |
| 0          | D           |

SUB PREFIX

METHOD FOR FORMING A DATABASE TO ROUTE A DATA PACKET AND METHOD FOR ROUTING AND A ROUTER USING THE METHOD THEREOF

BACKGROUND OF THE INVENTION

1. Field of the Invention

The present invention relates to a router, and more particularly, to a method for forming a database to route a data packet from a plurality of prefixes and a method for routing and a router using the method thereof. The present application is based on Korean Patent Application No. 2000-49932, which is incorporated herein by reference.

2. Description of the Related Art

At the present time, generally, most data networks have a packet net based on IP (Internet Protocol). The respective packets in the packet net have information about the sender and receiver on a header thereof. By analyzing the information on the header of the packet, a transmission path is determined, which is called routing. A switching apparatus that performs the routing operation such as a router and a layer three switch is generally called a routing apparatus. Here, the routing apparatus is called the router for the convenience of explanation.

Figure 1:
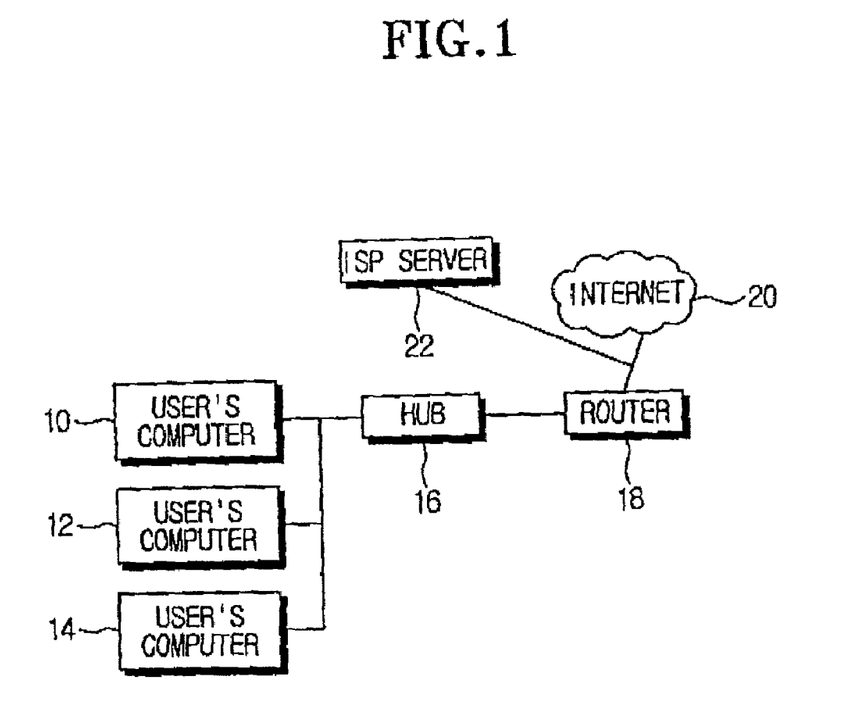
FIG. 1 is a view showing a construction of the system in which the router is adopted.

FIG. 1 is a view showing a construction of the system in which the router is adopted. A plurality of user's computers 10, 12, and 14 are connected to Internet 20 through a hub 16 and a router 18. Due to the very high transmission speed of a packet accompanied by a development of the transmission technology, the router is not capable of determining the transmission path with the header information in response to the speed of the transmitted packet in the Internet, which has a hierarchical address system, which may cause a problem of a speed bottleneck.

Also, due to the increase of the number of networks and hosts accompanied by a rapid development of the Internet, the number of existing IPv4 (IP version 4) addresses is running short. As a result, the routing between the networks is based on the CIDR (Classless InterDomain Routing) which does not classify the class B and the class C networks, and the prefixes for the routing are distributed at diverse lengths.

Accordingly, a longest matching prefix method is used to search for the most suitable routing path. The longest matching prefix method is a lookup method that, when there is more than one prefix matching with an individual address, selects the best matching prefixes.

The basic concept of a prefix expansion is described with reference to FIG. 2.

Figure 2:
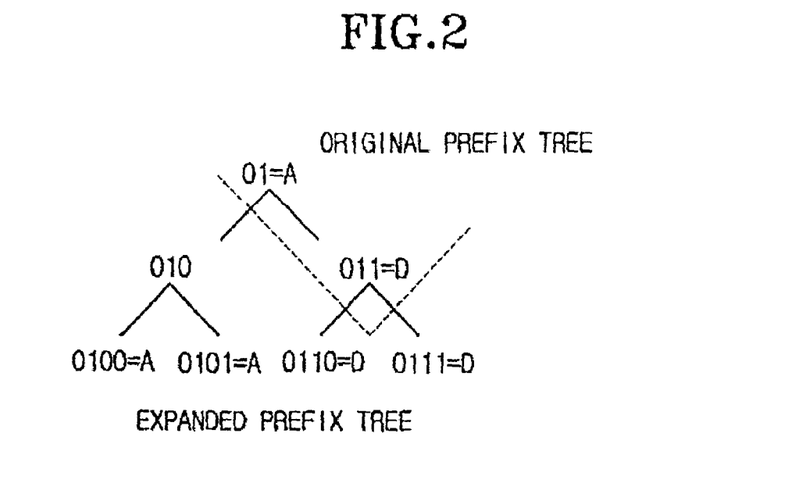
FIG. 2 shows an example of a prefix expansion.

FIG. 2 shows an example of a prefix expansion, in which the prefixes are mapped into bit strings of reference length 4. Here, the prefix 01 and the prefix 011 have information A and D, respectively.

The bit strings of length 4 may have sixteen (16) possible prefixes. Only four (4) prefixes of 0100, 0101, 0110, 0111 among the sixteen (16) prefixes have a meaningful value, and respective values correspond to a value of the prefix which is close to a reference row.

Next, a prefix expansion table formed from a prefix table by making use of such prefix expansion will be described.

Figure 3A:
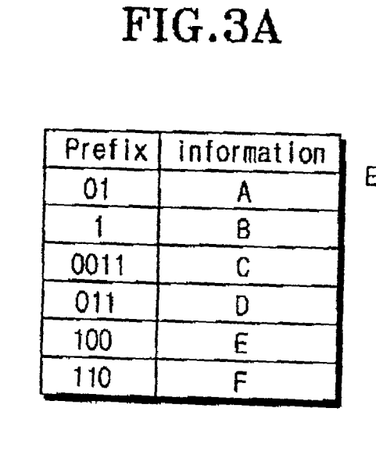
FIG. 3A shows an example of an original prefix table.
Figure 3B:
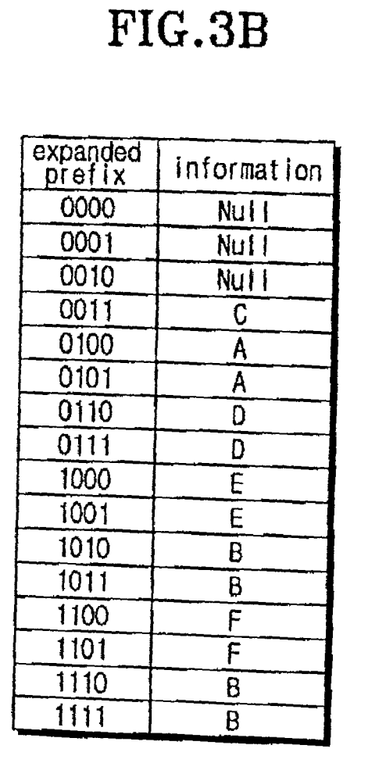
FIG. 3B shows a prefix expansion table formed from the prefix table of FIG. 3A by the reference length of 4.

FIG. 3A shows an example of an original prefix table. The prefixes 01, 1, 0011, 011, 100, and 110 have information A, B, C, D, E, and F, respectively. FIG. 3B shows the prefix expansion table formed from the prefix table of FIG. 3A into the reference length of 4 bits.

As shown in FIG. 3B, a prefix expansion table is formed by mapping the prefixes into the reference length 4, which is the length of the longest bit string. The prefixes that do not include information are given a value of NULL.

While the information lookup under a tree type data structure must refer to the memory in every step, according to the structure transformed into the prefix expansion table, it is possible to obtain the desired information by only one reference to memory, i.e., without requiring reference to memory in every step.

However, while there are six (6) entries in the original prefix table, there are sixteen (16) entries in the prefix expansion table. As a result, the capacity of the memory has to be increased, causing cost increase.

Next, the prefix table formed to have a tree structure will be described.

Figure 4A:
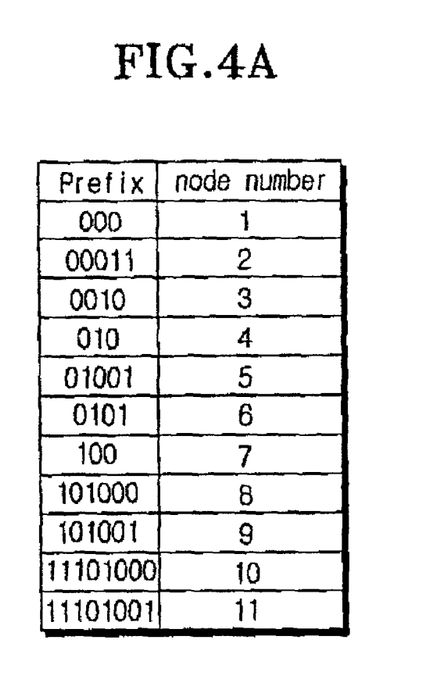
FIG. 4A shows another example of a prefix table.
Figure 4B:
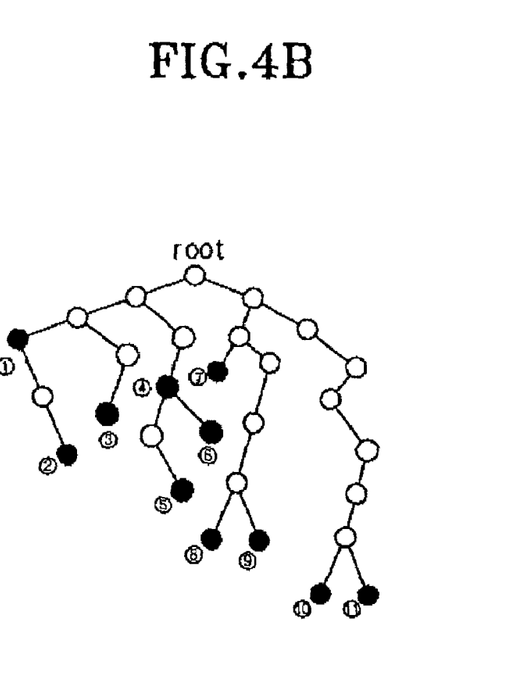
FIG. 4B shows a prefix tree formed from the prefix table of FIG. 4A by making use of a binary tree.

FIG. 4A shows another example of a prefix table, and FIG. 4B shows a prefix tree formed from the prefix table of FIG. 4A by making use of a binary tree. The prefix tree of FIG. 4B has depth of 8.

Generally, the binary tree forms a tree in a manner such that the binary tree starts at the root from the most significant bit of the prefix, and if the value of the bit is 0, moves to the left, one node at a time, and if the value of the bit is 1, moves to the right, one node at a time.

At this time, the last leaf becomes a prefix node which has information, i.e., the last leaf becomes a meaningful prefix node. The middle nodes, which exist from the root to the last leaf, may be a meaningful prefix node or a meaningless prefix node which does not have information.

In the lookup operation for searching for a desired IP address, performance of the lookup operation depends on the number of the middle nodes, which are needed to search for the desired prefix, and the capacity of the memory depends on the number of total nodes. Accordingly, it is critical to decrease the depth of the tree.

SUMMARY OF THE INVENTION

The present invention is developed in order to solve the problem described above. One object of the present invention is to provide a method for forming a database to route a data packet from a plurality of prefixes, wherein, when the length of the prefixes is shorter than a reference length, information can be obtained from the prefixes, and when the length of the prefixes is longer than the reference length, information can be obtained from a sub-table.

Another object of the present invention is to provide a method for routing the data packet from the plurality of prefixes, wherein a reference to the process information about the respective packets is rapidly performed at a packet data net having a hierarchical address system, such as the Internet, thereby reducing the time for analyzing an address of the individual packet and providing a high speed packet transmission service.

Still another object of the present invention is to provide a router in which a forwarding table corresponding to a data structure is formed and managed by a processor, and obtaining information by analyzing the address on a header of the individual packet is performed through a method based on the hardware, thereby enhancing a routing efficiency.

In order to achieve the above object, the present invention provides a method for forming a database to route a data packet from a plurality of prefixes having information about a desired destination and a certain length thereof. The method comprises the steps of forming a main-table by aligning the prefixes into a reference length, storing information about the prefixes when the length of the prefixes is shorter than the reference length, and storing connection information about a table from which information about the prefixes can be obtained when the length of the prefixes is longer than the reference length at an entry of the main-table, and forming a sub-table with respect to prefixes having longer length than the reference length by calculating a distance between a base point and the respective prefixes and arraying nodes having a same distance, the base point being a node indicated by the connection information.

In order to achieve the above object, the present invention provides a method for routing a data packet from a plurality of prefixes having information about a desired destination and a certain length through a router. The router has a main-table formed by aligning the plurality of prefixes into reference length according to the longest prefix matching method, and a sub-table formed with respect to the longer prefixes than the reference length according to a prefix distance ordering method. The method comprises the steps of searching for information about a packet which is intended to be routed with reference to the main-table, obtaining the corresponding information about the packet when the information about the packet is available with reference to the main-table, and obtaining the corresponding information about the packet with reference to the sub-table when the information about the packet is unavailable with reference to the main-table.

In order to achieve the above object, the present invention provides a router for routing a data packet from a plurality of prefixes having a certain length. The router comprises a database forming section for forming a main-table by aligning the plurality of prefixes into a reference length, storing the information about the prefixes at an entry of the main-table when the length of the prefixes is shorter than the reference length, storing connection information when the length of the prefixes is longer than the reference length, and forming a sub-table with respect to the prefixes that are longer than the reference length by arraying nodes having a same distance between a base point and the respective prefixes, the base point being a node indicated by the connection information, and a lookup section for searching for the information about the packet which is intended to be routed with reference to the main-table, obtaining the corresponding information when the information about the packet is available with reference to the main-table, and obtaining the corresponding information with reference to the sub-table when the information about the packet is unavailable with reference to the main-table.

DETAILED DESCRIPTION OF THE PREFERRED EMBODIMENT

A method for forming a database to route a data packet from a plurality of prefixes and a method for routing and a router using the method thereof according to the preferred embodiment of the present invention are described below with reference to the accompanied reference drawings.

Figure 5A:
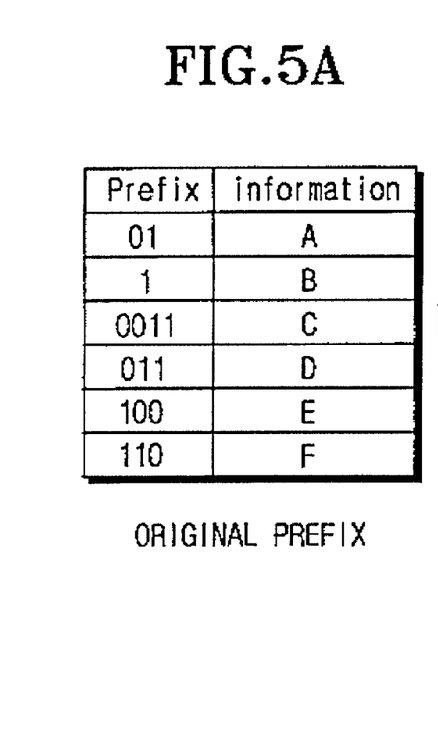
FIG. 5A shows an example of an original prefix table.

FIG. 5A shows an example of an original prefix table.

Figure 5B:
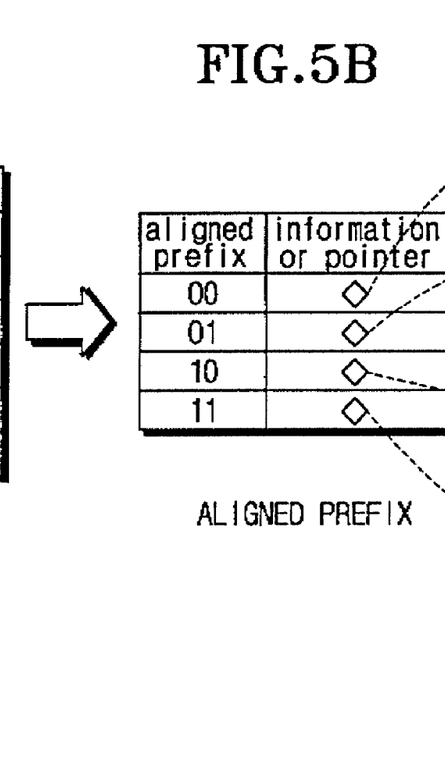
FIG. 5B shows a main-table formed by aligning the original prefix table FIG. 5A into the reference length of 2 bits.

FIG. 5B shows a main-table formed by aligning the original prefix table FIG. 5A into a reference length of 2 bits.

Here, it is impossible to search for information about the prefixes just by bit strings 00, 01, 10, and 11 aligned in an entry of the main-table of FIG. 5B. Thus, the respective entries are assigned with connection information to form a sub-table as shown in FIG. 5C.

Figure 5C:
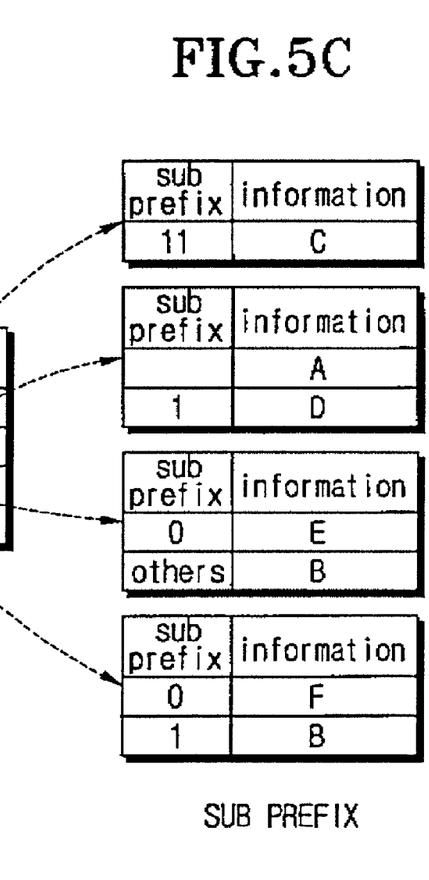
FIG. 5C is a sub-table of FIG. 5B.

Accordingly, a new database of FIGS. 5B and 5C is formed from the original prefix table of FIG. 5A. By making use of the newly formed database, it is possible to search for information corresponding to bit strings of the original prefix table. For example, in order to search for the information corresponding to the bit string 110 of the original prefix table, bit string 110 is aligned to bit string 11 into the reference length of 2. At this time, the value corresponding to the bit string 11 is obtained from the main-table, and then the pointer is stored in the aligned prefix 11 of the main-table to indicate the address of the sub-table formed with respect to the prefix 11.

As a result, based on the reference of the third bit 0 of the original bit string 110, information corresponding to the original bit string 110 is F in the sub-table.

Figure 6A:
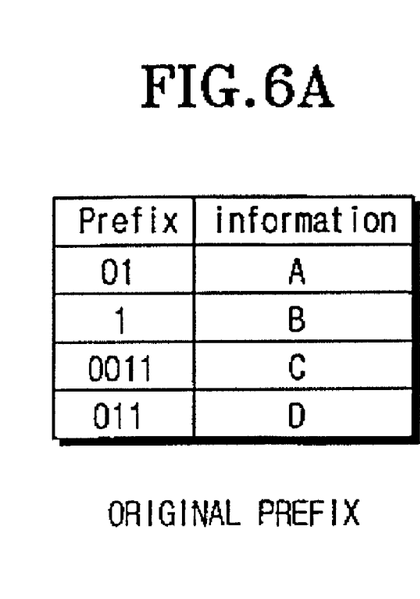
FIG. 6A shows another example of an original prefix table.
Figures 6B, 6C:
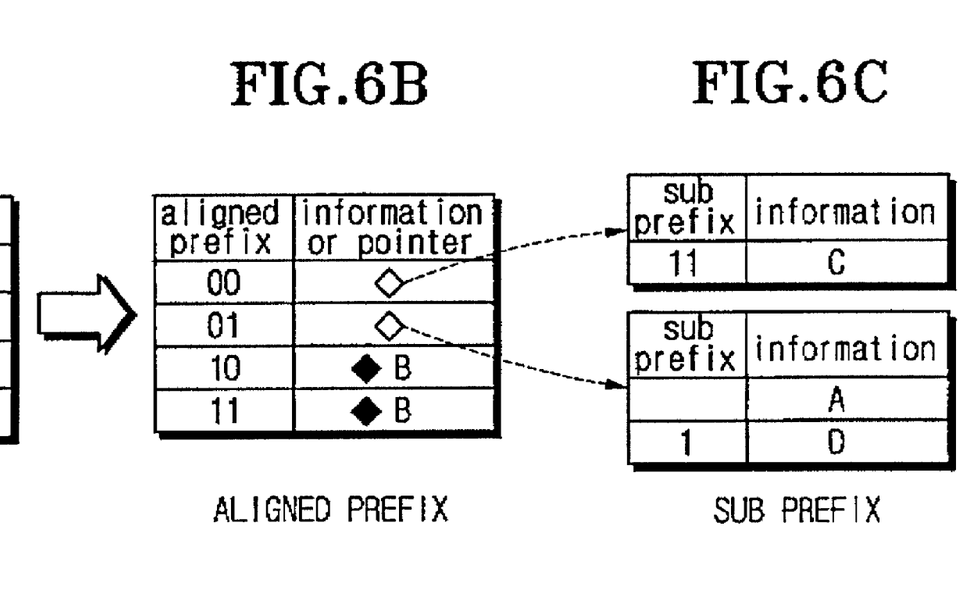
FIG. 6B shows a main-table formed from the original prefix table of FIG. 6A.
FIG. 6C shows a sub-table of FIG. 6B.

FIGS. 6A–6C show another example of the database formed according to the present invention.

FIG. 6A shows another example of an original prefix table. More specifically, FIG. 6A shows a prefix table without having the prefixes 100 and 110 of the prefix table of FIG. 5A.

FIG. 6B shows a main-table formed by aligning the original prefix table of FIG. 6A into a reference length of 2 bits.

Since both prefixes 10 and 11 aligned in the main-table of FIG. 6B have information B, the prefixes 10 and 11 do not form a sub-table.

Therefore, if the data has 1 in the most significant bit, it is possible to search for the corresponding information just by the main-table.

Meanwhile, the remaining prefixes, except for the prefixes 10 and 11, i.e., the prefixes 00 and 01 form the sub-table as shown in FIG. 6C.

Accordingly, a new database of FIGS. 6B and 6C is formed from the original prefix table of FIG. 6A. By making use of the newly formed database, it is possible to search for information corresponding to bit strings of the original prefix table. For example, in order to search for the information corresponding to the bit string 0011 of the original prefix table, bit string 00 of the main-table is referred to.

Then a pointer is stored in the aligned prefix 00 of the main-table to indicate the address of the sub-table formed with respect to the prefix 00.

As a result, the information corresponding to the original bit string 0011 is C based on the value of 11 obtained from the sub-table of FIG. 6C.

The prefixes of the main-table store information corresponding to the prefix or information indicating a connection to the sub-table.

According to the present invention, the main-table is formed by aligning the prefixes having diverse lengths into the reference length. If the length of the prefix is longer than the reference length, the sub-table is formed.

A process for forming the sub-table will now be described in greater detail. Here, a method for forming the sub-table is called a distance ordering method.

FIGS. 7A–7F show the original prefix table of FIG. 4A expressed according to the distance ordering method.

The prefix of the shortest length among the prefixes of FIG. 4A is the prefix of length 3.

The bit strings 000, 001, 010, 011, 100, 101, 110, and 111 are available among the bit strings of length 3 at a root.

Figure 7A:
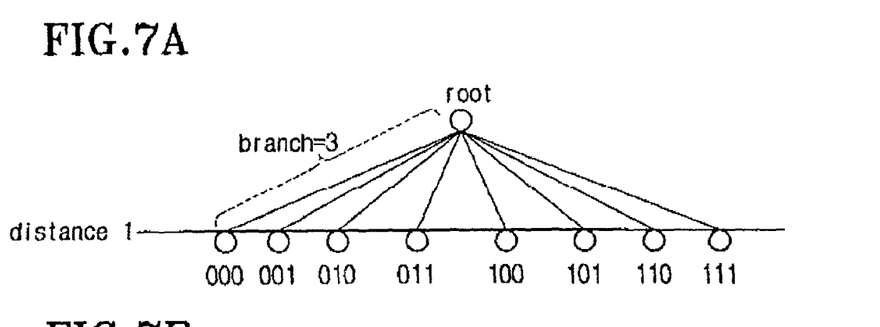
FIGS. 7A through 7F show the original prefix table of FIG. 4A expressed according to a distance ordering method.

As shown in FIG. 7A, the bit strings are arrayed at a first array having the same distance from the root.

If the prefixes of FIG. 4A are arrayed from the root, meaningful bit strings among the available bit strings of length 3 are 000, 001, 010, 100, 101, and 111, and meaningless bit strings are 011 and 110.

The two meaningless nodes 011 and 110 are provided with an address only. The three meaningful nodes 000, 010, and 100 are mapped to the corresponding prefix information 1, 4, and 7 of FIG. 4A. The nodes 000, 010, and 100, of which information is mapped, are expressed as Δ in FIG. 7B.

Figure 7B:
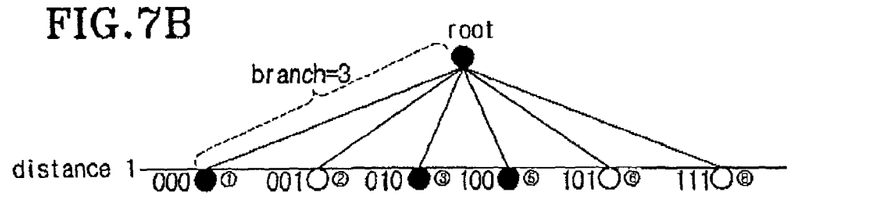

Further, the nodes at the first array 000, 001, 010, 100, 101, and 111 are provided with an address or a pointer in an ascending order such as 1, 2, 3, 5, 6, and 8.

The two meaningless nodes 011 and 110 are omitted in FIG. 7B.

The node 000 corresponding to the address 1 is connected downward to the prefix 00011.

Figure 7C:
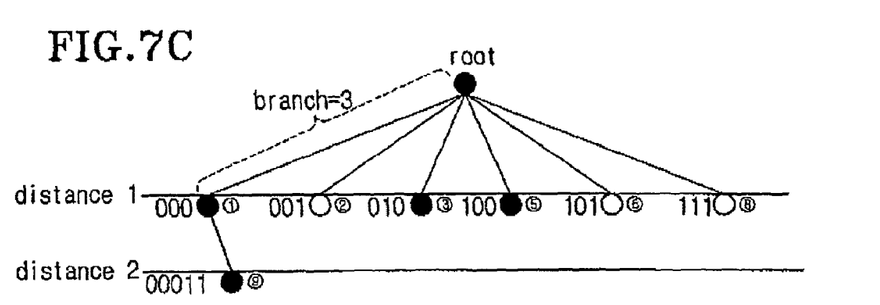

Since the node 000 is meaningful, the node 00011 is arrayed at a second array (distance 2) after the node 000, and has an address 9 as shown in FIG. 7C.

If the node 000 is meaningless, 2 bits of the node 00011 are skipped and positioned at the node 000.

Figure 7D:
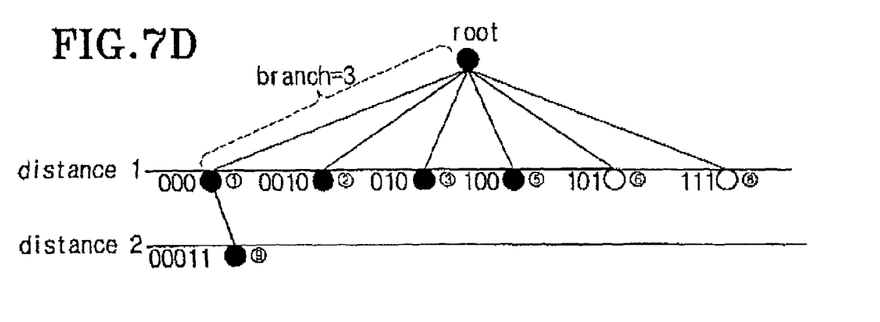

Also, since the node 001 is meaningless, the node 0010 existing after the node 001 can be positioned at the node 001 as shown in FIG. 7D. Positioning the node in a manner as described above is called a leaf push. That is, the leaf push means skipping of the middle nodes, which do not have information.

When a predetermined node is searched for after construction according to the prefix distance ordering method, the node which is leaf pushed is skipped in the search operation.

Figure 7E:
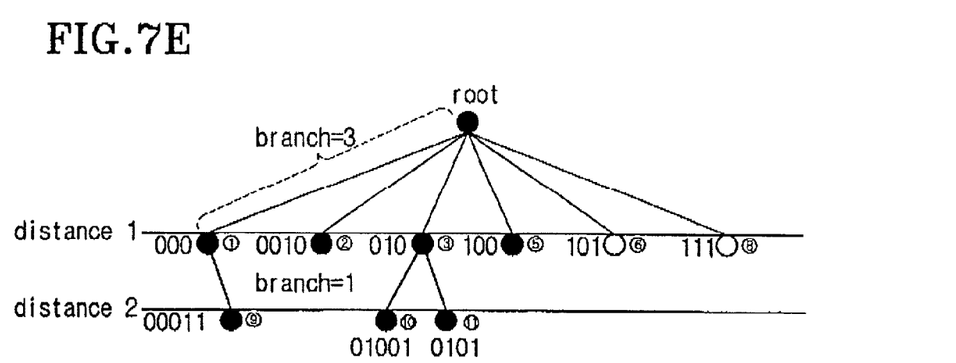

The node 010 is meaningful itself and has two nodes 01001 and 0101 after the node 010.

As shown in FIG. 7E, the two nodes 01001 and 0101 are arrayed from the node 010 by the branch of 1.

Such array means that the nodes are arrayed at the distance 2 from the root.

After that, the data structure is completed from the original prefix table through the repeated process as described above.

Figure 7F:
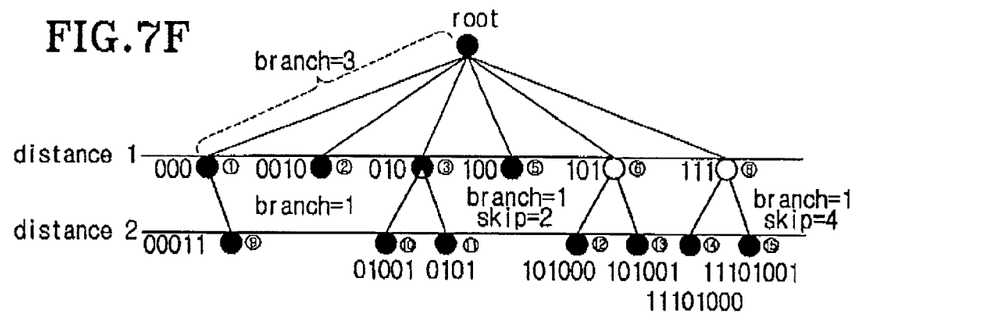

FIG. 7F shows the completed prefix distance ordering tree structure.

As shown in FIG. 7F, the nodes 010, 101, and 111 indicate the address of the nodes 01001, 101000, and 11101000, respectively.

If the first array is completed, the respective nodes of the first away have the node information and connection information about the nodes which are re-arrayed from the nodes in the first array. The connection information indicates the address of the node disposed at the left-most position from the node itself.

If there are ramifications from a predetermined node, the number of addresses required is as many as the length of the ramifications.

In the above-mentioned example, since the first distance has the branch of 3, eight (8) addresses from 000 to 111 are required.

Accordingly, there is a problem that the long branch causes unnecessary middle nodes to be inserted. However, if the length of the branch is restricted, the problem can be solved.

According to the prefix distance ordering tree structure as constructed above, there are a total of sixteen (16) nodes, including the eleven (11) prefixes at the root.

Although there is a little difference depending on the respective prefix tables, the number of nodes decreases far more than that of the aforementioned prefix tree structure which requires 29 nodes, or that of the patricia tree structure that performs the fundamental path compression and requires 23 nodes (2×11+1=23).

Also, while the tree of the aforementioned prefix tree structure has a depth of 8, as shown in FIG. 4B, the depth of the structure according to the distance ordering method is only 2, as shown in FIG. 7F.

Next, a method for searching for information with reference to the main-table and the sub-table formed according to the present invention about the individual packet which enters through an input terminal of the router will be described.

Figure 8:
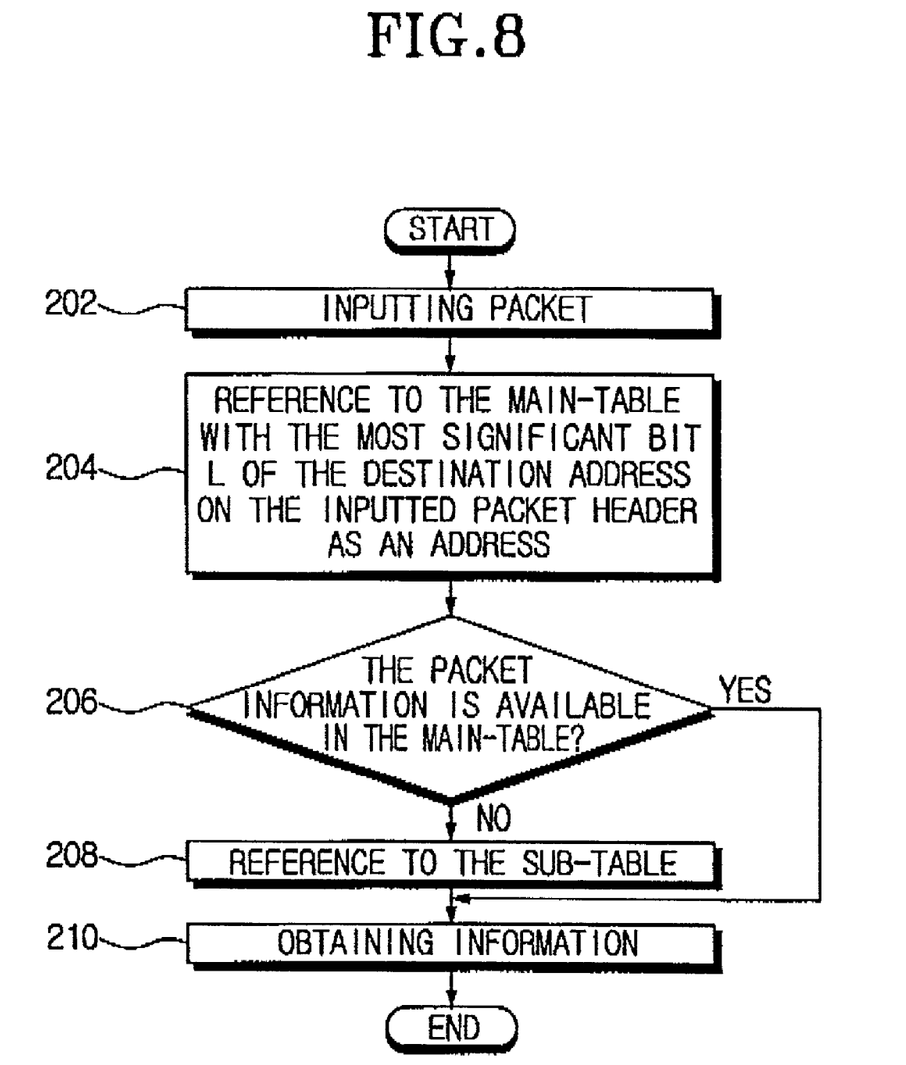
FIG. 8 is a flowchart showing the method for searching for information according to the present invention.

FIG. 8 is a flowchart showing the method for searching for information according to the present invention.

If the packet is inputted (step 202), reference is made to the main-table with the most significant bit (for example L) of the destination address on the header of the inputted packet as an address (step 204).

If information about the packet is available in the main-table (step 206), the information is obtained (step 210).

However, if the information is unavailable (step 206), reference to the sub-table is performed (step 208), and then the information is obtained (step 210).

Next, a method for searching for information in the sub-table in the case that there is a sub-table connected with the main-table will be described with reference to FIG. 7F.

If the bit string starting from 101000 enters, since the branch from the root is 3, the node address of the first distance corresponding to the bit string 101000 has the value of 6, which is made by adding 5 (=101) to the address 1 of the node 000, indicated by the root as variable of prearranged bits 101 of the bit string.

Since the corresponding node 101 is the middle node, the node does not include the desired information. The node 101 indicates the node 101000 corresponding to the address 12. Since the value of skip is 2, two bits 00 next to the 101 are disregarded. Since the branch is 1, the next bit 0 is added to the basic address 12.

From the equation of 12+0(0)=12, the next desired node becomes the address 12. The corresponding node 101000 has information about the prefix 101000. The lookup operation is performed in a manner as described above.

According to the method for forming the database to route the data packet from the plurality of prefixes and the method for routing and the router using the method thereof as described above, when the length of the prefix is shorter than the reference length, the information is obtained from the main-table, while, when the length of the prefix is longer than the reference length, the information is obtained from the sub-table. Therefore, the information is obtained promptly.

Also, since the time for analyzing the address can be reduced by referring to the process information quickly about the individual packet in the packet data net having a hierarchical address systems such as the Internet, it is possible to provide a high-speed packet transfer service.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method for forming a database to route a data packet from a plurality of prefixes having information about a desired destination and a certain length thereof, the method comprising the steps of:

forming a main-table by aligning the prefixes into a reference length;

storing information about the prefixes when the length of the prefixes is shorter than the reference length, and storing connection information about a table from which information about the prefixes can be obtained when the length of the prefixes is longer than the reference length at an entry of the main-table; and forming a sub-table with respect to prefixes having longer length than the reference length by calculating a distance between a base point and the respective prefixes and arraying nodes having a same distance, the base point being a node indicated by the connection information.

2. The method of claim 1, wherein, in the step of forming the main-table, the plurality of prefixes are arrayed into the reference length according to a longest prefix matching method.

3. The method of claim 1, wherein, in the step of forming the sub-table, with respect to the prefixes having longer length than the reference length, remaining bit strings except for a reference length bit are arrayed according to a prefix distance ordering method.

4. The method of claim 3, wherein the step of forming the sub-table further comprises the steps of:

(a) aligning the prefixes, which include the bit strings longer than the reference length, in an ascending order;

(b) arraying the prefixes having the reference length at a first row from the aligned prefixes;

(c) adding information corresponding to the prefixes arrayed at the first row and connection information about the prefixes to be connected after the prefixes of the first row;

(d) arraying the prefixes to be connected after the prefixes of the first row; and (e) forming a data structure of the sub-table by repeating from the step (b) to the step (d).

5. A method for routing a data packet from a plurality of prefixes having information about a desired destination and a certain length through a router, the router having a main-table formed by aligning the plurality of prefixes into a reference length according to the longest prefix matching method, and a sub-table formed with respect to the prefixes that are longer than the reference length according to a prefix distance ordering method, the method comprising the steps of:

searching for information about a packet which is intended to be routed with reference to the main-table;

obtaining corresponding information about the packet when the information about the packet is available with reference to the main-table; and obtaining corresponding information about the packet with reference to the sub-table when the information about the packet is unavailable with reference to the main-table.

6. The method of claim 5, wherein, when the length of the prefixes is shorter than the reference length, an entry of the main-table stores the information about the prefixes, while, when the length of the prefixes is longer than the reference length, the entry of the main-table stores connection information of the sub-table.

7. A router for routing a data packet from a plurality of prefixes having a certain length, the router comprising:

a database forming section for forming a main-table by aligning the plurality of prefixes into a reference length, storing information about the prefixes at an entry of the main-table when the length of the prefixes is shorter than the reference length, storing connection information when the length of the prefixes is longer than the reference length, and forming a sub-table with respect to the prefixes that are longer than the reference length by arraying nodes having a same distance between a base point and the respective prefixes, the base point being a node indicated by the connection information; and a lookup section for searching for information about the packet which is intended to be routed with reference to the main-table, obtaining corresponding information when the information about the packet is available with reference to the main-table, and obtaining corresponding information with reference to the sub-table when the information about the packet is unavailable with reference to the main-table.

* * * * *